(12) United States Patent
Fu et al.

(10) Patent No.: US 12,459,330 B2
(45) Date of Patent: Nov. 4, 2025

(54) SYSTEM AND METHOD OF CONTROLLING AIR CONDITIONING SYSTEM FOR VEHICLE

(71) Applicants: Hyundai Motor Company, Seoul (KR); Kia Corporation, Seoul (KR)

(72) Inventors: Ding Yuan Fu, Shandong (CN); Hao Fu, Shandong (CN); Xiao Rui Zhai, Shandong (CN); Jingjing Shao, Shandong (CN); Tae Hun Jung, Seoul (KR); Xiao Zhong Ding, Shandong (CN); Qing Dong Hou, Shandong (CN); Xueshan Tang, Shandong (CN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 340 days.

(21) Appl. No.: 18/109,976

(22) Filed: Feb. 15, 2023

(65) Prior Publication Data

US 2024/0174048 A1 May 30, 2024

(30) Foreign Application Priority Data

Nov. 24, 2022 (CN) .......................... 202211484515.4

(51) Int. Cl.
*B60H 1/00* (2006.01)
*B60R 16/03* (2006.01)
(52) U.S. Cl.
CPC ..... *B60H 1/00742* (2013.01); *B60H 1/00757* (2013.01); *B60H 1/00771* (2013.01); *B60H 1/00792* (2013.01); *B60H 1/00828* (2013.01)

(58) Field of Classification Search
CPC ............ B60H 1/00742; B60H 1/00735; B60H 1/00757; B60H 1/00771; B60H 1/00792; B60H 1/00828; B60R 16/037
See application file for complete search history.

(56) References Cited

U.S. PATENT DOCUMENTS

| | | | |
|---|---|---|---|
| 9,758,016 B1* | 9/2017 | Baron | B60H 1/008 |
| 2015/0151602 A1* | 6/2015 | Suzuki | B60G 17/017 |
| | | | 280/6.157 |
| 2018/0281560 A1* | 10/2018 | Dearth | B60H 1/00978 |
| 2020/0223323 A1* | 7/2020 | Fujino | B60H 1/00842 |

FOREIGN PATENT DOCUMENTS

| | | |
|---|---|---|
| JP | 2020-121595 A | 8/2020 |
| KR | 2019-0048207 A | 5/2019 |

* cited by examiner

*Primary Examiner* — Deming Wan
(74) *Attorney, Agent, or Firm* — Fox Rothschild LLP

(57) ABSTRACT

A system includes a plurality of sensors configured to sense an opening/closing of a door, fastening/unfastening of a seat safety belt, and change in a vehicle height; a first processor configured to determine the number of all occupants in the vehicle by the opening/closing of the door, the fastening/unfastening of the seat safety belt, and the change in the vehicle height sensed by the plurality of sensors and preliminarily determine an internal circulation ratio of the air conditioning system according to the determined number of all occupants in the vehicle; a second processor configured to adjust the internal circulation ratio which is preliminarily determined by the first processor according to at least one of a sound intensity and a sound duration time in the vehicle; and a controller configured to control the air conditioning system according to the adjusted internal circulation ratio.

18 Claims, 8 Drawing Sheets

SYSTEM AND METHOD OF CONTROLLING AIR CONDITIONING SYSTEM FOR VEHICLE

CROSS-REFERENCE TO RELATED APPLICATION

This application claims, under 35 U.S.C. § 119(a), priority to and the benefit of Chinese Patent Application No. 202211484515.4 filed in the Chinese National Intellectual Property Administration on Nov. 24, 2022, the entire contents of which are incorporated herein by reference.

BACKGROUND

(a) Field

The present disclosure relates to a technical field of controlling a vehicle, and more particularly, to an apparatus and a method for controlling an air conditioning system for a vehicle.

(b) Description of the Related Art

The comfortability of the vehicle is maintained by a vehicle air conditioning system. The air conditioning system may heat or cool the inside air by fresh inflow air and circulate the inside air after heating and cooling. Currently, there are two methods of flowing the air into a heating ventilation and air conditioning (HVAC) system. One method is a fresh air mode (that is, an external circulation mode) and the other method is a recirculation air mode (that is, an internal circulation mode). When heating or cooling performance is maximized in an electric vehicle, a battery power consumption may be increased. If the inflow air is not controlled by the HVAC (that is, an internal circulation ratio/external circulation ratio are not controlled), the driving performance of the vehicle cannot be optimized. Specifically, if the fresh air mode is selected as an air inflow method of the HVAC system at a low ambient air, a positive temperature coefficient (PTC) heater may heat the air. Accordingly, an all-electric range (AER) of the electric vehicle is reduced at the low ambient temperature as compared with a mild ambient temperature. In this case, in order to increase the AER of the electric vehicle, the internal circulation mode is generally selected to provide a part of the inflow air to the HVAC. In this case, generally, the ratio of the inflow air is fixed. However, when the fixed internal circulation ratio is too high, fog may occur on the windshield and the situation inside the vehicle may not be constant. Further, when the conversation time of the occupants in the vehicle is too long or the conversation is too loud, the humidity and carbon dioxide in the vehicle are rapidly increased, which increases the risk of fogging. At this time, the fixed internal circulation ratio is not controlled according to the change in the circumstance in the vehicle so that the air quality may be degraded, and the safety problem of the vehicle may be caused, simultaneously.

Accordingly, there is an urgent need for a method and system of controlling an air conditioning system for a vehicle which adjusts an internal circulation ratio to reduce the risk of fogging, thereby adapting to various situations in the vehicle.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a system and a method of controlling an air conditioning system for a vehicle to improve the stability of the vehicle by reducing the risk of fogging by preliminarily determining an internal circulation ratio according to the number of occupants in the vehicle and then controlling the preliminarily determined internal circulation ratio according to a conversation situation of the occupants in the vehicle.

According to an exemplary embodiment of the present disclosure, a system of controlling an air conditioning system for a vehicle is provided. The system includes a plurality of sensors configured to sense an opening/closing of at least one door, fastening/unfastening of at least one seat safety belt, and a change in a vehicle height; a first processor configured to determine the number of all occupants in the vehicle by the opening/closing of the at least one door, the fastening/unfastening of the at least one seat safety belt, and the change in the vehicle height sensed by at least one sensor of the plurality of sensors and determine a preliminary internal circulation ratio of the air conditioning system according to the determined number of all occupants in the vehicle; a second processor configured to adjust the preliminary internal circulation ratio into an adjusted internal circulation ratio according to at least one of a sound intensity in the vehicle and a sound duration time in the vehicle; and a controller configured to control the air conditioning system according to the adjusted internal circulation ratio.

if at least one sensor of the plurality of sensors senses that a driver seat side door is open and a driver seat safety belt is fastened, the first processor is further configured to determine that there is a driver, if the at least one sensor senses that a front passenger seat side door is open and a front passenger seat safety belt is fastened, the first processor is further configured to determine that there is a front passenger, and if at least one sensor of the plurality of sensors senses that at least one back seat side doors is open and the change in the vehicle height changes on at least one side, the first processor is further configured to determine a number of back seat occupants according to the sensed change in the vehicle height.

If the change in the vehicle height is sensed at one side, the first processor is further configured to: determine that the number of occupants is zero if the change in the vehicle height is 0 mm; determine that the back seat occupant enters the vehicle to increase the number of back seat occupants by 1 if the change in the vehicle height decreases; and determine that the back seat occupant moves a position to maintain the number of back seat occupants if the change in the vehicle height increases.

If at least one sensor of the plurality of sensors senses the change in the vehicle height at both sides, the first processor is configured to determine a maximum value of the number of back seat occupants determined at both sides to be the number of back seat occupants.

The second processor is further configured to determine: whether an occupant is on a call, to acquire a call duration time if it is determined that the occupant is on the call, not to adjust the preliminarily determined internal circulation ratio if the call duration time is equal to or lower than a first predetermined time, and if the call duration time is longer than the first predetermined time, to reduce the preliminarily determined internal circulation ratio by a first predetermined value at every first predetermined time interval until the internal circulation ratio becomes zero.

If a predetermined time elapses after the call ends, the second processor is further configured to recover the internal circulation ratio to the preliminarily determined internal circulation ratio.

The second processor is further configured: to collect the sound intensity in the vehicle if it is determined that the occupant is not on the call; to determine a reference sound intensity in the vehicle; not to adjust the preliminarily determined internal circulation ratio if the current sound intensity in the vehicle is equal to or lower than a sum of the reference sound intensity and a first predetermined sound intensity value; to determine the duration time of the current sound intensity in the vehicle if the current sound intensity in the vehicle is larger than the sum of the reference sound intensity and the first predetermined sound intensity value and is smaller than a sum of the reference sound intensity and a second predetermined sound intensity value which is larger than the first predetermined sound intensity value; not to adjust the preliminarily determined internal circulation ratio if the duration time of the current sound intensity in the vehicle is equal to or shorter than a second predetermined time; to reduce the preliminarily determined internal circulation ratio by a second predetermined value at every second predetermined time interval if the duration time of the current sound intensity in the vehicle is longer than the second predetermined time; to determine the duration time of the current sound intensity in the vehicle if the current sound intensity in the vehicle is larger than the sum of the reference sound intensity and the second predetermined sound intensity value; not to adjust the preliminarily determined internal circulation ratio if the duration time of the current sound intensity in the vehicle is equal to or shorter than a third predetermined time which is shorter than the second predetermined time; to reduce the preliminarily determined internal circulation ratio by the second predetermined value at every second predetermined time interval if the duration time of the current sound intensity in the vehicle is longer than the third predetermined time and is equal to or shorter than the second predetermined time; and to reduce the preliminarily determined internal circulation ratio by a third predetermined value which is larger than the second predetermined value at every second predetermined time interval if the duration time of the current sound intensity in the vehicle is longer than the second predetermined time.

The second processor is further configured to determine the reference noise intensity in the vehicle according to a driving speed of the vehicle and whether a radio is on or off.

If an ambient temperature outside the vehicle is equal to or higher than a predetermined temperature, the controller is configured not to control the air conditioning system according to the internal circulation ratio.

If the at least one door is completely closed, the first processor is configured to end the determining the number of all occupants in the vehicle.

According to another exemplary embodiment of the present disclosure, a method of controlling an air conditioning system for a vehicle is provided. The method includes: sensing opening/closing of at least one door, fastening or unfastening of at least one seat safety belt, and a change in a vehicle height; determining the number of all occupants in the vehicle by the sensed opening/closing of the at least one door, the fastening or unfastening of the at least one seat safety belt, and the change in the vehicle height; preliminarily determining an internal circulation ratio of the air conditioning system according to the determined number of all occupants in the vehicle; adjusting the preliminarily determined internal circulation ratio into an adjusted internal circulation ratio according to at least one of a sound intensity in the vehicle and/or a sound duration time in the vehicle; and controlling the air conditioning system according to the adjusted internal circulation ratio.

The determining the number of all occupants in the vehicle includes: determining that there is a driver if a driver seat side door is open and fastening of a driver seat safety belt is sensed; determining that there is a front passenger if opening of a front passenger side door and fastening of a front passenger seat safety belt are sensed; and determining the number of occupants of the back seats according to the sensed change in the vehicle height if it is sensed that at least one of back seat side doors is open and the change in the vehicle height is sensed from at least one side.

The determining the number of back seat occupants if the change in the vehicle height is sensed at one side includes: determining the number of back seat occupants to be 0 when the change of the vehicle height is 0 mm; determining that the back seat occupant enters the vehicle to increase the number of back seat occupants to 1 if the change in the vehicle height decreases and determining that the back seat occupant moves a position to maintain the number of back seat occupants if the change in the vehicle height increases.

The determining the number of back seat occupants further includes: if the change in the vehicle height is sensed at both sides, determining a maximum value of the number of back seat occupants determined at both sides as the number of the back seat occupants.

The adjusting the internal circulation ratio which is preliminarily determined according to at least one of: a sound intensity and a sound duration time includes: determining whether the occupant is on a call; acquiring a call duration time if it is determined that the occupant is on the call; not adjusting the preliminarily determined internal circulation ratio if the call duration time is below a first predetermined time; and reducing the preliminarily determined internal circulation ratio by a first predetermined value at a first predetermined time interval until the internal circulation ratio becomes zero if the call duration time is longer than the first predetermined time.

The adjusting the internal circulation ratio which is preliminarily determined according to at least one of a sound intensity and a sound duration time further includes: recovering the internal circulation ratio to the preliminarily determined internal circulation ratio if a predetermine time elapses after ending the call.

The adjusting the internal circulation ratio which is preliminarily determined according to at least one of a sound intensity and a sound duration time further includes: collecting the sound intensity in the vehicle if it is determined that the occupant is not on the call; determining a reference sound intensity in the vehicle; not adjusting the preliminarily determined internal circulation ratio if the current sound intensity in the vehicle is equal to or lower than a sum of the reference sound intensity and a first predetermined sound intensity value; determining a duration time of the current sound intensity in the vehicle if the current sound intensity in the vehicle is larger than the sum of the reference sound intensity and the first predetermined sound intensity value and is smaller than a sum of the reference sound intensity and a second predetermined sound intensity value which is larger than the first predetermined sound intensity value; not adjusting the preliminarily determined internal circulation ratio if the duration time of the current sound intensity in the vehicle is equal to or shorter than a second predetermined time; reducing the preliminarily determined internal circulation ratio by a second predetermined value at every second predetermined time interval if the duration time of the current sound intensity in the vehicle is longer than the second predetermined time; determining the duration time of the current sound intensity in the vehicle if the current sound intensity in the vehicle is larger than the sum of the reference sound intensity and the second predetermined sound intensity value; not adjusting the preliminarily determined internal circulation ratio if the duration time of the current sound intensity in the vehicle is equal to or shorter than a third predetermined time which is shorter than the second predetermined time; reducing the preliminarily determined internal circulation ratio by a second predetermined value at every second predetermined time interval if the duration time of the current sound intensity in the vehicle is longer than the third predetermined time and is equal to or shorter than the second predetermined time, and reducing the preliminarily determined internal circulation ratio by a third predetermined value which is larger than the second predetermined value at every second predetermined time interval if the duration time of the current sound intensity in the vehicle is longer than the second predetermined time.

The determining a reference sound intensity in the vehicle includes: determining a reference noise intensity in the vehicle depending on a driving speed of the vehicle and whether a radio is On or Off.

If an ambient temperature outside the vehicle is equal to or higher than a predetermined temperature, the control of the air conditioning system according to the internal circulation ratio is not performed.

If the door is completely closed, the determining the number of all occupants in the vehicle ends.

The present disclosure uses the technical measures and has the following advantageous effects.

The internal circulation ratio is preliminarily determined according to the number of occupants in the vehicle to constantly reduce the risk of fogging.

It is determined whether the conversation time of the occupants is too long or the conversation is too loud according to sound data collected by a microphone and call data of a vehicle on-board system which implements the real-time interlink between a mobile phone and the vehicle and the initial internal circulation ratio is adjusted according to the sound duration time and/or the sound intensity to further reduce the risk of fogging, thereby improving the stability of the vehicle driving.

In the winter, all electric range (AER) of the electric vehicles may be increased and the stability of the vehicle is not reduced.

BRIEF DESCRIPTION OF THE DRAWINGS

Hereinafter, the exemplary embodiments of the present disclosure will be described in more detail in conjugation of the drawings. For clear description, the same member on different drawings are denoted by the same reference numeral. It should be noted that the drawing is merely illustrative, but is not necessarily illustrated according to the ratio.

DETAILED DESCRIPTION OF THE EMBODIMENTS

Hereinafter, the exemplary embodiment of the present disclosure will be described in detail and the exemplary embodiment is carried based on the technical measures and detailed embodying method and specific operation process will be disclosed, but the scope of the present disclosure is not limited to the following exemplary embodiment.

Figure 1:
FIG. 1 is a block diagram illustrating an entire configuration of a system of controlling an air conditioning system for a vehicle according to an exemplary embodiment of the present disclosure.

FIG. 1 is a block diagram illustrating an entire configuration of a system of controlling an air conditioning system for a vehicle according to an exemplary embodiment of the present disclosure. It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. As illustrated in FIG. 1, a system of controlling an air conditioning system for a vehicle according to the exemplary embodiment of the present disclosure includes a plurality of sensors, a first processor, a second processor, and a controller.

The plurality of sensors detects open/closed state of a door, fastening or unfastening of a seat safety belt, and a changed value of a vehicle height. The plurality of sensors transmits the detected open/close of the door, the fastening/unfastening of the seat safety belt, and the changed value of the vehicle height to the first processor. The first processor is configured to determine the number of all occupants in the vehicle by the open/close state of the door, the fastening/unfastening of the seat safety belt, and the changed value of the vehicle height detected by the plurality of sensors and to preliminarily determine an internal circulation ratio of the air conditioning system for the vehicle according to the determined number of the all occupants in the vehicle. The second processor is configured to adjust the internal circulation ratio which is preliminarily determined by the first processor according to at least one of a sound intensity and a sound duration time in the vehicle. The controller is configured to control the air conditioning system for the vehicle according to the adjusted internal circulation ratio.

Figure 2:
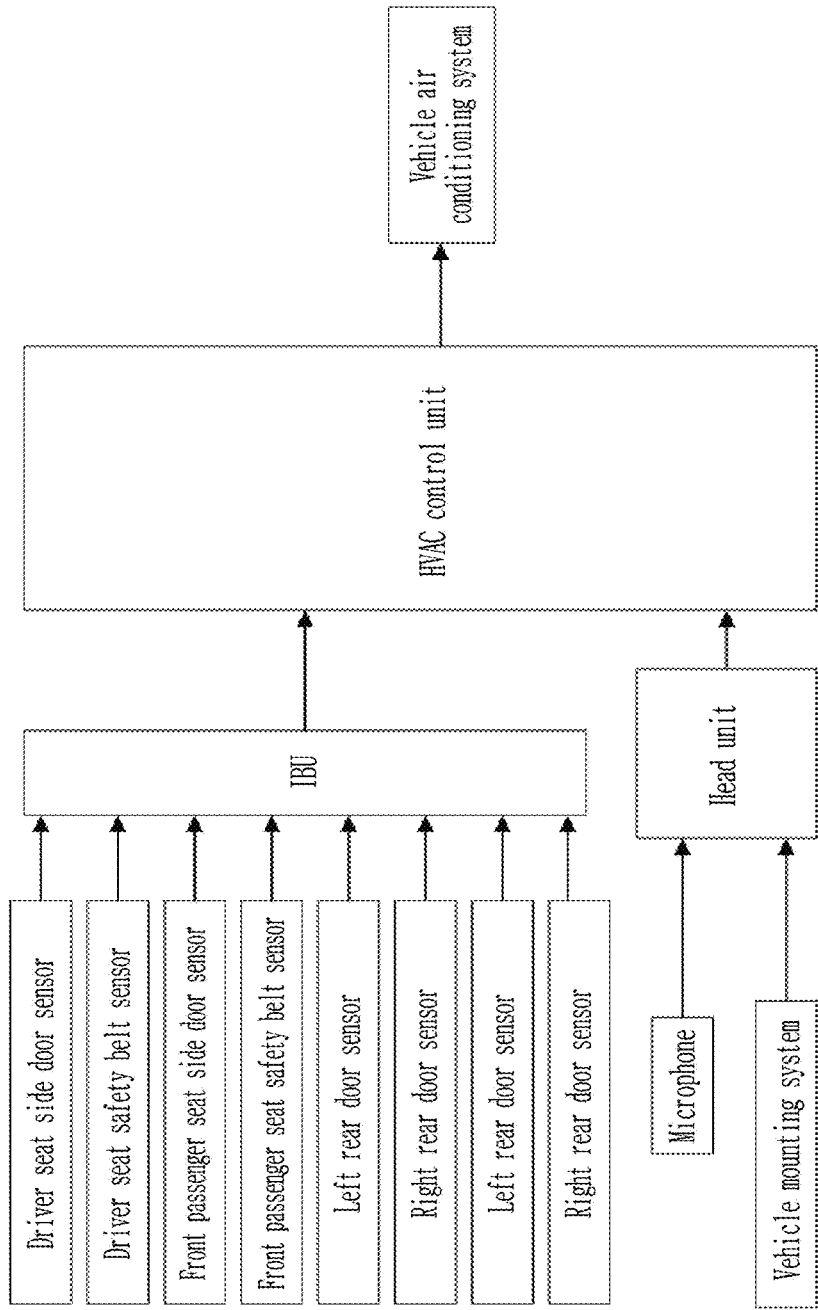
FIG. 2 is a block diagram illustrating a specific configuration of a system of controlling an air conditioning system for a vehicle according to an exemplary embodiment of the present disclosure.

FIG. 2 is a block diagram illustrating a specific configuration of a system of controlling an air conditioning system for a vehicle according to an exemplary embodiment of the present disclosure. The plurality of sensors includes a driver's side door sensor, a front passenger seat side door sensor, a left rear door sensor, a right rear door sensor, a driver seat belt sensor, a front passenger seat belt sensor, a left rear vehicle height sensor, and a right rear vehicle height sensor. The first processor, the second processor, and the controller may be implemented by an integrated body unit (IBU), a head unit (HD), a heating ventilation and air conditioning (HVAC) control unit.

As illustrated in FIG. 2, a smart key determines a time for the HVAC control unit to collect and analyze data to acquire the internal circulation ratio of the air conditioning system for the vehicle. Specifically, when a user approaches the vehicle with the smart key, for example, the IBU detects that the smart is 1 to 2 m away from the vehicle, the IBU may send a signal to the HVAC control unit. By doing this, a power of the HVAC control unit is turned on to start an operation of the HVAC control unit.

As described above, the IBU receives the data from the door sensor, the seat belt sensor, and the vehicle height sensor to determine the number of the all occupants in the vehicle and send the data related to the determined result to the HVAC control unit. The HVAC control unit preliminarily determines the internal circulation ratio of the air conditioning system for the vehicle based on the data and controls the air conditioning system for the vehicle.

Specifically, the open/close of the vehicle is sensed by the door sensor. For example, a left front door sensor, a right front door sensor, the left rear door sensor, and the right rear door sensor are installed on the doors of the vehicle to detect the open/close of each door of the vehicle. The open/close state of the door may be used to determine the number of occupants in the vehicle.

The fastening or unfastening of the seat belt is detected by a pressure type belt sensor. For example, the safety belt sensors are installed in the left front seat (that is, a driver seat) and the right front seat (that is, a front passenger seat) so that the fastening or unfastening of the set safety belt is used to determine whether there is a person in the driver seat and the front passenger seat by combining the states of the driver seat side door and the front passenger seat side door.

The changed value of the vehicle height may be detected by the vehicle height sensor. One end of the vehicle height sensor is connected to a vehicle frame and the other end is mounted on a suspension system of the vehicle to detect a relative vertical displacement of a vehicle body and a lower cantilever or a damper lower bracket, thereby detecting the changed value of the vehicle height. The vehicle height sensor is installed on the left rear side or the right rear side of the vehicle to detect a boarding situation of the back seat. For example, when a person sits on the back seat, the vehicle height sensor detects that the height of the vehicle is lowered.

The head unit receives data from a microphone and a vehicle onboard system to determine the sound duration time and/or the sound intensity (that is, a conversation situation of the occupant) in the vehicle and send data related to the determined result to the HVAC control unit. The HVAC control unit adjusts the preliminarily determined internal circulation ratio based on the data related to the determined result and controls the air conditioning system for the vehicle according to the adjusted internal circulation ratio.

Figure 3:
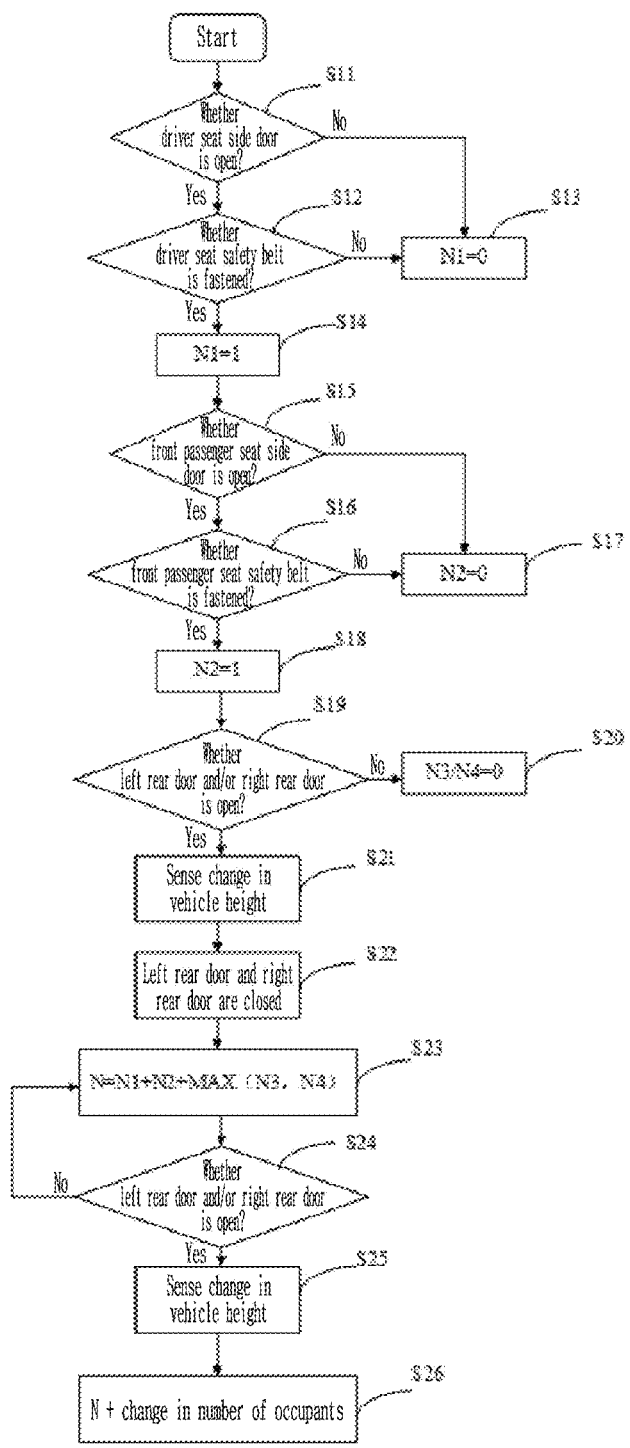
FIG. 3 is a flowchart illustrating a process of determining the number of all occupants in a vehicle according to an exemplary embodiment of the present disclosure.

FIG. 3 is a flowchart illustrating a process of determining the number of all occupants in a vehicle according to an exemplary embodiment of the present disclosure. As illustrated in FIG. 3, the first processor determines whether the driver seat side door is open in step S11, determines whether the driver side safety belt is fastened in step S12, and determines whether there is a driver based on whether the driver seat side door is open, or the driver side safety belt is fastened. One sensor (specifically, the left front door sensor) of the plurality of sensors detects that the door is open (Yes in the step S11) and the other sensor (specifically, the driver seat safety belt sensor) detects that the driver side safety belt is fastened (Yes in the step S12), the first processor determines that there is the driver according to the opening of the driver side door (Yes in the step S11) and the fastening of the driver seat safety belt (Yes in the step S12), and makes the number of drivers to be 1 (N1=1) in step S14. When the sensor detects that the driver side door is not open (No in the step S11) or detects that the driver seat safety belt is not fastened (No in the step S12), as the driver side door is not open (No in the step S11) or the driver seat safety belt is not fastened (No in the step S12), the first processor determines that there is no driver and makes the number of drivers to be 0 (N1=0) in step S13.

Similarly, the first processor determines whether a front passenger seat is occupied according to whether the front passenger seat side door is open in step S15 and whether the front passenger seat side safety belt is fastened in step S16. The sensor (specifically, the right front door sensor) senses that the front passenger side door is open (Yes in the step S15) and the sensor (specifically, the safety belt sensor on the passenger seat) senses the fastening the passenger seat safety belt (Yes in the step S16), the first processor determines that there is an occupant on the front passenger seat and makes the number of passenger seat occupants to be 1 (N2=1) in step S18. When the sensor senses that the passenger side door is not open (No in the step S15) or the passenger side safety belt is not unfastened (No in the step 16), the first processor determines there is no occupant on the passenger seat as the front passenger seat side door is not open (No in the step S15) or the front passenger seat safety belt is not fastened (No in the step S16) and makes the number of passengers to be 0 (N2=0) in step S17.

Further, the first processor may determine the number of back seat occupants according to whether the back seat side door is open in step S19 and the change of the vehicle height S2.

When both the left rear side door and the right rear side door are not open (No in the step S19), the right rear side vehicle height sensor and the left rear side vehicle height sensor do not need to sense the change of the vehicle height and the processor determines that there is no person on the back seat.

When the sensor (specifically, the left rear door sensor and the right rear door sensor) senses that at least one of the back seat side doors is open (Yes in the step S19), the other one sensor (specifically, the vehicle height sensor) senses the change in the vehicle height at least one side of the vehicle in step S21. For example, when the left rear door is open, the left rear vehicle height sensor is used to sense the change of the vehicle height and when the right rear door is open, the right rear vehicle height sensor is used to sense the change in the vehicle height. When the left rear door and the right rear door are simultaneously open, at least one of the right rear vehicle height sensor and the left rear vehicle height sensor is used to sense the change in the vehicle height. When only one vehicle height sensor senses the change in the vehicle, the first processor determines the number of occupants according to the sensed change of the vehicle height. When both the vehicle height sensors sense the change of the vehicle height, the first processor makes a maximum value of the number of back seat occupants determined by both sensors to be the number of back seat occupants.

When the change in the vehicle height is sensed using the at least one of the right rear vehicle height sensor and the left rear vehicle height sensor, if the change of the vehicle height is 0 (the height does not change), the first processor determines the number of back seat occupants to be 0. When the change in the vehicle height is smaller than 0 (the height of the vehicle decreases), the first processor determines that the back seat occupant enters the vehicle to increase the number of back seat occupants by 1. When the change in the vehicle height is larger than 0 (the height of the vehicle increases), the first processor determines that the back seat occupant moves the position to maintain the number of back seat occupants.

The vehicle height sensor senses the change in the vehicle height at least one side in step S21 and then when the left rear door and the right rear door are completely closed in step S22, it means that the boarding process of the passenger already ends. Accordingly, the first processor ends the determining of the number of the back seat occupants to determine N3 and/or N4 which is the number of the back seat occupants. N3 may be the number of back seat occupants sensed using the right rear vehicle height sensor and N4 may be the number of back seat occupants sensed using the left rear vehicle height sensor. In the most of the vehicles, the range of N3 or N4 is 1, 2, or 3, but the present disclosure is not limited thereto.

When the vehicle height sensor senses the change in the vehicle height in both sides, a maximum value of the number of the back seat occupants determined by both the vehicle height sensors is considered as the number of the back seat occupants. That is, the number of the back seat occupants is MAX (N3, N4).

Correspondently, the number of the all occupants in the vehicle is N=N1+N2+MAX(N3, N4) in step S23.

After the number of the all occupants in the vehicle is determined to be N, if the left rear door or the right rear door is open again after driving for a predetermined time (Yes in S24), the left rear vehicle height sensor or the right rear vehicle height sensor continuously senses the change of the vehicle height in step S25. By doing this, the first processor acquires the change in the number of the occupants so that the number of the all occupants in the vehicle N' is N+ the change of the number of the occupants in step S26.

Figure 4:
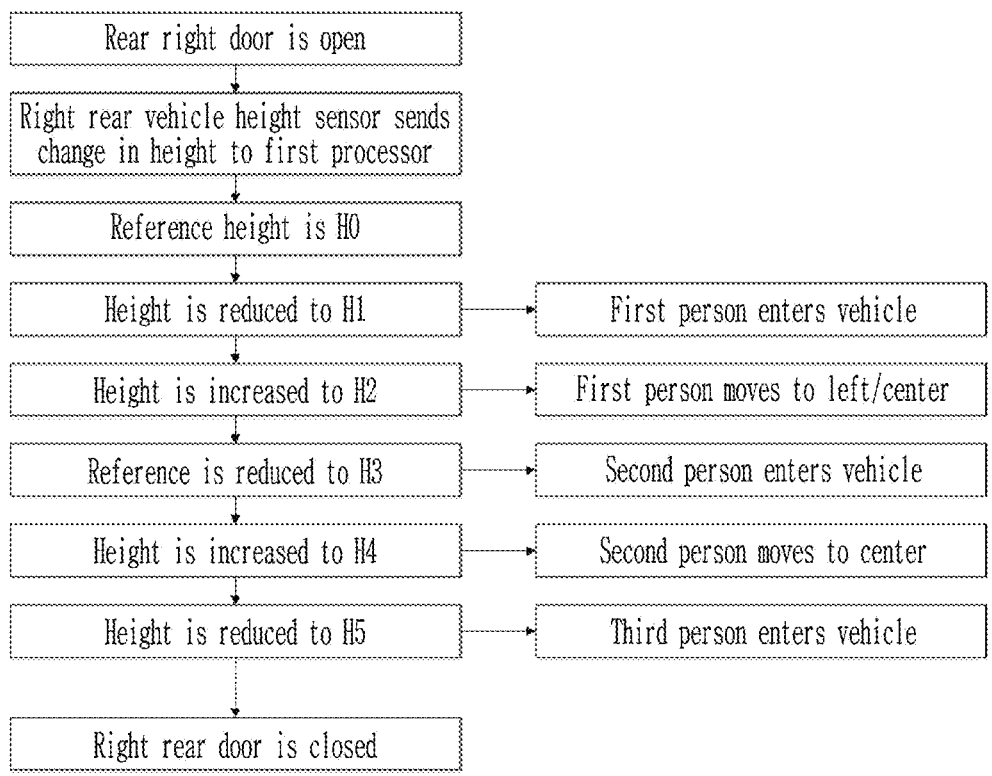
FIG. 4 is a schematic diagram illustrating a process of determining the number of back seat occupants according to an exemplary embodiment of the present disclosure.

FIG. 4 is a schematic diagram illustrating a process of determining the number of back seat occupants according to an exemplary embodiment of the present disclosure. Hereinafter, a process of determining the number of back seat occupants will be described in more detail with an example where the right rear door is open.

When the right rear door is open, preferably, the change in the vehicle height is sensed using the right rear vehicle height sensor and the sensed height change is sent to the first processor. Here, a reference height of the vehicle is H0. When the height of the vehicle is reduced to H1, that is, the change in the height is smaller than 0, the first processor determines that a first person enters the vehicle. With respect to the height H1, if the height of the vehicle is increased to H2, that is, the change in the height is larger than 0, the first processor determines that the first person moves to the other side of the back seat (for example, moves to a left position of the back seat or a middle position between the left side and the right side). When the height of the vehicle is reduced from H2 to H3, the first processor determines that a second person enters the vehicle. Similarly, when the height of the vehicle is increased from H3 to H4, the first processor determines that the second person moves the position (for example, the second person moves to the middle position of the back seat). When the height of the vehicle is reduced from H4 to H5, the first processor determines that a third person enters the vehicle. Finally, when the right rear door is closed, the first processor determines that the number of back seat occupants is three.

The first processor records the numerical values of H0 to H5 and determines the number of all occupants in the vehicle. Accordingly, when the vehicle stops after driving for a predetermined time and then the back seat side door is open, the change of the number of back seat occupants is determined according to the change of the sensed value of the height sensor at the same side as the open back seat side door. For example, when H5 is already acquired and the number of back seat occupants is determined to be 3, if the value of the vehicle height sensed by the right rear vehicle height sensor is changed to be close to H3/H4 during the opening and closing the right rear door, it means that one back seat occupant is reduced. Specifically, when |H3|>|H4|, H3 means that the occupant is seated on both left and right back seats and H4 means that the occupant is seated on the left side and the middle of the back seat. When the value of the vehicle height sensed by the right rear vehicle height sensor is changed to be close to H1/H2, it means two back seat occupants are reduced. Specifically, in the case of |H1|>|H2|, H1 means that the occupant is seated on the right and H2 means that the occupant is seated on the left. When the value of the vehicle height sensed by the right rear vehicle height sensor is changed to be close to H0, it means that all the back seat occupants get off. That is, three back seat occupants are reduced.

Correspondently, when the sensed values of the vehicle height sensor are changed from H0/H1/H2/H3/H4 to H1/H2/H3/H4/H5, an increased amount of the seat occupants may be calculated.

Accordingly, if the value sensed by the vehicle height sensor is just lowered after the door opens, it means that the occupant gets in and sits on the door side position and if the value goes down and then up, it means that the occupant position moves, and if the value goes down and then up to the previous level, it means that the occupant gets in and then gets off again.

Figure 5:
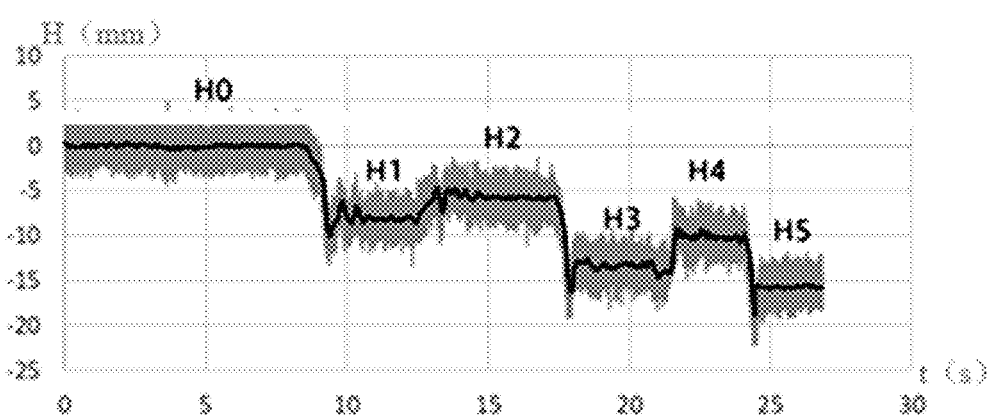
FIG. 5 is a schematic diagram illustrating a vehicle height sensed by a vehicle height sensor at a rear right side in a process of determining the number of back seat occupants according to an exemplary embodiment of the present disclosure, wherein a gray line indicates a sensed vehicle height and a block line indicates a filtered vehicle height.

According the above-described process, FIG. 5 is a schematic diagram illustrating a vehicle height sensed by a right rear height sensor in a process of determining the number of back seat occupants. In the following Table 1, values corresponding to H1 to H5 of FIG. 5 are illustrated.

TABLE 1

| H0 | H1 | H2 | H3 | H4 | H5 |
|---|---|---|---|---|---|
| 0 | −8 | −4 | −13 | −11 | −16 |

The values of H1 to H5 illustrated in FIG. 5 and Table 1 are results corrected according to a parameter of the vehicle suspension system based on a parking position (for example, a flat road surface) of a specific vehicle and a weight of the occupant. However, the values illustrated in FIG. 5 and Table 1 are just examples, but the present disclosure is not limited thereto. Suspension tuning of different vehicles is different so that the value for different vehicle may be different from the values represented in Table 1. When the vehicle is parked on an inclined surface, rather than a flat road, that is, a value for different parking gradient may be different from the values represented in Table 1. Accordingly, the value of the H1 to H5 may be additionally adjusted by referring to the gradient of the road. Specifically, the gradient may be obtained from an in-vehicle signal.

As illustrated in FIG. 5 and Table 1, when the vehicle is parked on the flat road, the reference height of the vehicle may be set to H1=0. If a difference between a first height and a second height of two adjacent heights is smaller than 0, the first processor determines that the back seat occupant enters the vehicle to increase the number of back seat occupant to 1. If the difference between the first height and the second height of two adjacent heights is larger than 0, the first processor determines that the back seat occupant changes the position to maintain the number of back seat occupant.

Similarly, the process illustrated in FIG. 4 may be applied to a case in which the left rear door is open, and the left rear vehicle height sensor senses the change of the vehicle height.

As described above, when the right rear door is open, the first processor determines the number of back seat occupants N3 is 3 according to the change in the vehicle height sensed by the right rear vehicle height sensor. Simultaneously, the number of back seat occupants may be determined using the left rear vehicle height sensor. For example, when a first person enters the vehicle through the right rear door and is seated in the right back seat, the left rear vehicle height sensor also senses the vehicle height H1'. H1' sensed by the left rear vehicle height sensor is larger than H1 sensed by the right rear vehicle height sensor due to the mounting positions of the left rear vehicle height sensor and the right rear vehicle height sensor and the door through which the occupant enters. Through the process similar to the process of sensing the change of the vehicle height by the right rear vehicle height sensor, the left rear vehicle height sensor may determine the number of back seat occupants to N4=3.

According to the exemplary embodiment of the present disclosure, the first processor may preliminarily determine the internal circulation ratio of the vehicle air conditioning system according to the determined number of all occupants in the vehicle.

Table 2 represents the preliminarily determined internal circulation ratio (A %) according to the different number of occupants at the different vehicle outside temperature (AMB).

TABLE 2

| AMB (° C.) | Number of all occupants in vehicle | | | | |
|---|---|---|---|---|---|
| | 1 | 2 | 3 | 4 | 5 |
| 0 | 30% | 20% | 10% | 0% | 0% |
| −5 | 30% | 20% | 10% | 0% | 0% |
| −10 | 30% | 30% | 20% | 0% | 0% |
| −15 | 30% | 30% | 20% | 0% | 0% |

TABLE 2-continued

| AMB (° C.) | Number of all occupants in vehicle | | | | |
|---|---|---|---|---|---|
| | 1 | 2 | 3 | 4 | 5 |
| −20 | 30% | 30% | 30% | 0% | 0% |
| −30 | 30% | 30% | 30% | 0% | 0% |

The preliminarily determined internal circulation ratio (A %) represented in Table 2 may be corrected by several tests. When the vehicle outside temperature is equal to or higher than a predetermined temperature, the vehicle outside temperature is not low so that fogging does not occur on the front windshield. Therefore, the control of the vehicle air conditioning system according to the magnitude of the internal circulation ratio may not be performed. The predetermined temperature may be 0° C.

All the vehicle outside temperatures represented in Table 2 are below 0° C., but the present disclosure is not limited thereto.

Further, the internal circulation ratio (A %) may also be adjusted according to an in-vehicle air humidity. When the vehicle outside temperature is low, the internal circulation ratio (A %) may be set to be high due to the low air humidity and if the number of occupants is increased, the internal circulation ratio (A %) may be set to be slightly low due to the increase of the humidity caused by respiration and conversation.

Figure 6:
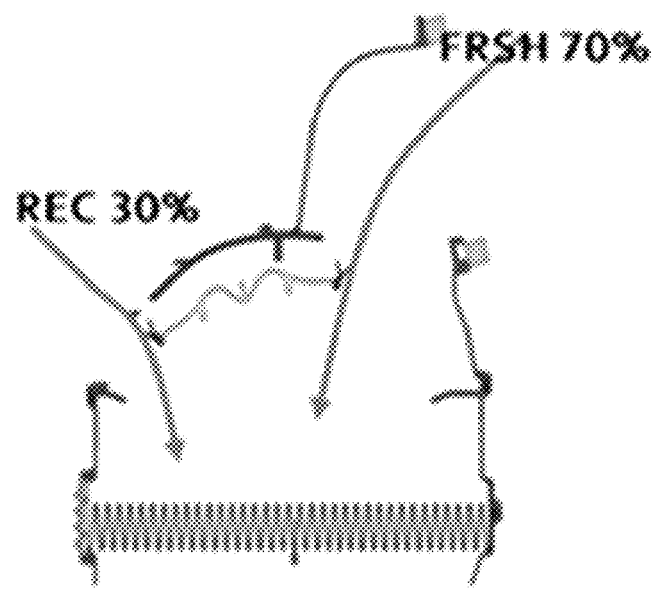
FIG. 6 is a schematic diagram illustrating a structure of an internal circulation REC and fresh air circulation FRESH in an air conditioning system for a vehicle.

FIG. 6 is a schematic diagram illustrating a structure of an internal circulation REC and fresh air circulation FRESH in an air conditioning system for a vehicle. As illustrated in FIG. 6, the internal circulation ratio is 30% and the fresh air circulation (that is, external circulation) ratio is 70%. The magnitude of the internal circulation ratio may be controlled using a valve.

Referring to Table 2, when the number of vehicle occupants is 4 to 5, the internal circulation ration is 0% and in FIG. 6, the corresponding valve moves to the left to fully close the opening of the internal circulation.

According to an exemplary embodiment of the present disclosure, the first processor sends the preliminarily determined internal circulation ratio of the air conditioning system for the vehicle to the second processor and the second processor adjusts the internal circulation ratio (A %) preliminarily determined by the first processor according to at least one of a sound intensity and a sound duration time in the vehicle.

Figure 7:
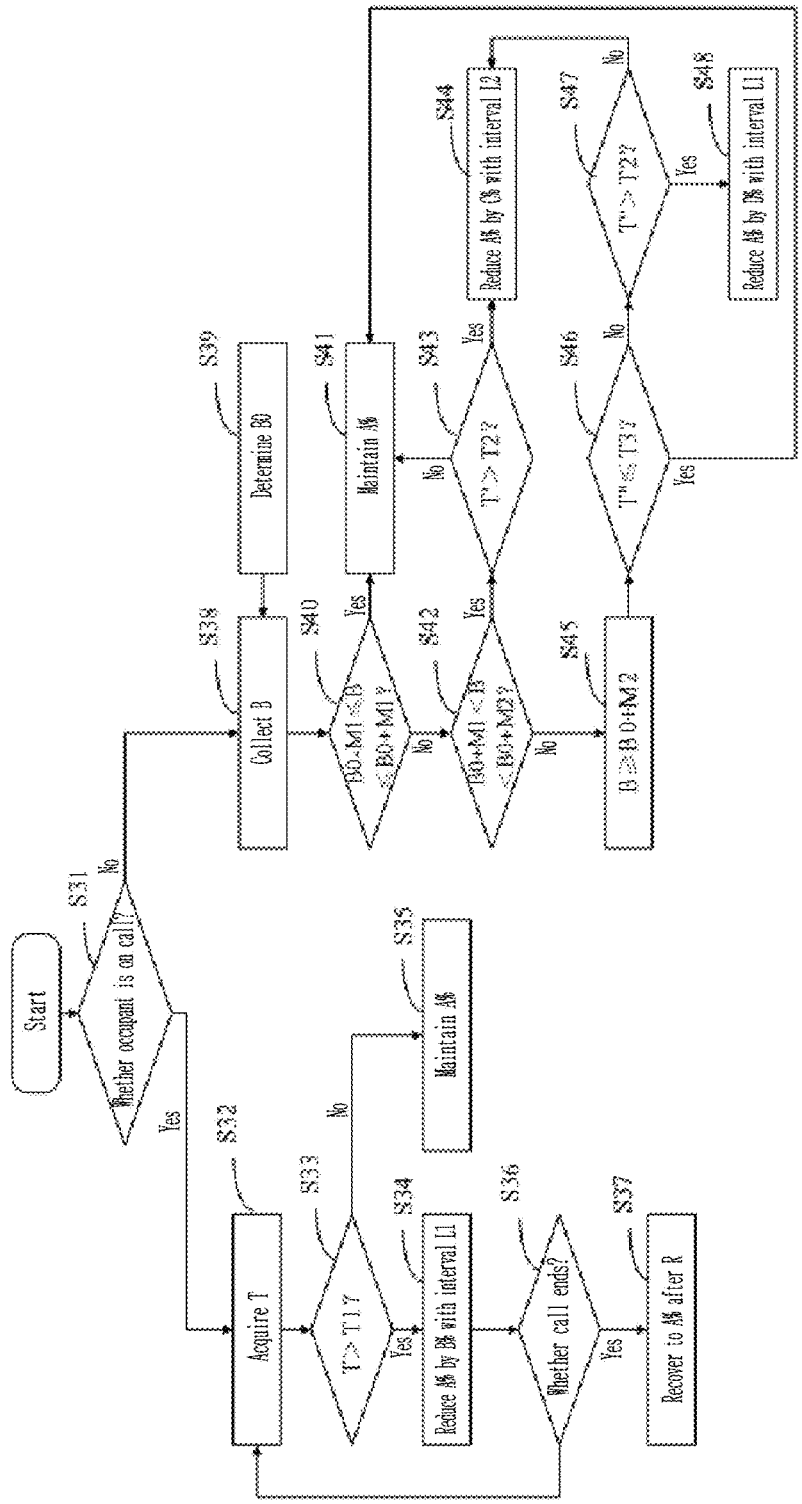
FIG. 7 is a schematic diagram illustrating a process of adjusting a preliminarily determined internal circulation ratio (A %) according to an exemplary embodiment of the present disclosure.

FIG. 7 is a schematic diagram illustrating a process of adjusting a preliminarily determined internal circulation ratio (A %) according to an exemplary embodiment of the present disclosure.

Since a very loud sound in the vehicle is highly likely to be a sound generated during a call made by the occupant, the second processor firstly determines whether the occupant is on the call in step S31. When it is determined that the occupant is on the call (Yes in the step S31), a call duration time T (that is, the sound duration time) is acquired in step S32.

The call duration time may be acquired using a vehicle on-board system which implements a real-time interlink between a mobile phone and the vehicle, such as WeChat, QQ, Bluetooth, carplay released from Apple, and carlife released by Baidu. Such the vehicle on-board system acquires the call duration time in real time to send the call duration time to the second processor.

When the call duration time T is equal to or shorter than a first predetermined time T1 (No in step S33), the preliminarily determined internal circulation ratio (A %) is not adjusted in step S35. At this time, the call of the occupant is not so long, so that the internal circulation ratio is maintained to A %. When the call duration time T is longer than the first predetermined time T1 (Yes in the step S33), the preliminarily determined internal circulation ratio is reduced by a first predetermined value (B %) at every first predetermined time interval L1 until the internal circulation ratio becomes zero in step S34. In this case, the conversation time of the occupants is increased to increase the in-vehicle humidity, which causes the fogging on the front windshield. Therefore, the internal circulation ratio (A %) may be gradually reduced until it becomes 0.

For example, the first predetermined time T1 may be 30 s, the first predetermined time interval L1 is 30 s, and the first predetermined value is 5%. That is, T is larger than 30 s, the second processor reduces A % by 5% with an interval of 30 s.

With regard to the setting of the first predetermined time T1, if the conversation time exceeds 30 s, generally, the humidity in the air is increased and the calling time is generally 30 s or shorter so that the first predetermined time T1 may be set to 30 s, but the present disclosure is not limited thereto.

Next, it is determined whether the call ends in step S36 and if a predetermined time R elapses after the call ends (Yes in the step S36), the internal circulation ratio is recovered to the preliminarily determined internal circulation ratio (A %).

With regard to the setting of the predetermined time R, the humidity in the air after the conversation is generally recovered to the humidity before the conversation after approximately five minutes so that the predetermined time R may be set to 5 minutes, but the present disclosure is not limited thereto.

When it is determined that the occupant is not on the call (No in the step S31), the second processor collects the sound intensity in the vehicle using a microphone of the vehicle to determine whether the conversation time of the occupant in the vehicle is too long or the conversation is too loud in step S38.

In one exemplary embodiment, the microphone installed in the vehicle collects the sound intensity in the vehicle in real time so that the microphone may consistently send data about the sound intensity in the vehicle to the second processor or consistently send the data to the second processor at a predetermined interval. For example, the microphone may send the data for 1 to 2 minutes at every ten minutes. Correspondingly, the second processor acquires a current sound intensity B in the vehicle.

According to another aspect, the second processor determines a reference sound intensity B0 in the vehicle in step S39 to compare the current sound intensity B and the reference sound intensity B0 to determine whether the conversion of the occupants in the vehicle is too loud. For example, the second processor may determine the reference sound intensity B0 in the vehicle according to a driving speed of the vehicle and radio on or off in the vehicle.

Table 3 represents values of the reference sound intensity B0 determined depending on the vehicle driving speed and the radio on or off in the vehicle.

TABLE 3

| Reference sound intensity B0 (dB) | Vehicle driving speed (kph) | | | |
| --- | --- | --- | --- | --- |
| | 0 | 60 | 80 | 120 |
| Radio OFF | 55 | 60 | 64 | 72 |
| Radio ON | 64 | 67 | 68 | 72 |

As represented in Table 3, the faster the driving speed of the vehicle, the higher the reference sound intensity B0 is set. The radio ON/OFF may affect the reference sound intensity B0 at a low speed, but the influence on the reference sound intensity B0 at a middle speed/high speed is not so large. The reference sound intensity B0 in the radio ON state is generally larger than the reference sound intensity B0 in the radio OFF state.

According to the exemplary embodiment of the present disclosure, when the current sound intensity B in the vehicle is equal to or larger than a difference between the reference sound intensity B0 and the first predetermined sound intensity value M1 and is equal to or lower than a sum of the reference sound intensity B0 and the first predetermined sound intensity value M1 (Yes in step S40), the preliminarily determined internal circulation ratio is not adjusted in step S41.

When the current sound intensity B in the vehicle is larger than the sum of the reference sound intensity B0 and the first predetermined sound intensity value M1 and is smaller than a sum of the reference sound intensity B0 and a second predetermined sound intensity value M2 which is larger than the first predetermined sound intensity value M1 (No in the step S40 and Yes in step S42), the second processor may determine the duration time T' of the current sound intensity in the vehicle. When the duration time T' of the current sound intensity in the vehicle is equal to or shorter than the second predetermined time T2 (No in step S43), the second processor does not adjust the preliminarily determined internal circulation ratio. When the duration time T' of the current sound intensity in the vehicle is longer than the second predetermined time T2 (Yes in the step S43), the second processor reduces the preliminarily determined internal circulation ratio (A %) by a second predetermined value (C %) at every second predetermined time interval L2 in step S44.

When the current sound intensity B in the vehicle is larger than the sum of the reference sound intensity B0 and the second predetermined sound intensity value M2 in step S45, the second processor determines a duration time T" of the current sound intensity in the vehicle. When the duration time T" of the current sound intensity in the vehicle is equal to or shorter than a third predetermined time T3 which is shorter than the second predetermined time T2 (Yes in step S46), the second processor does not adjust the preliminarily determined internal circulation ratio. When the duration time T" of the current sound intensity in the vehicle is longer than the third predetermined time T3 and is equal to or shorter than the second predetermined time T2 (No in the step S46 and No in S47), the second processor reduces the preliminarily determined internal circulation ratio (A %) by the second predetermined value (C %) at every second predetermined time interval L2 in the step S44. When the duration time T" of the current sound intensity in the vehicle is longer than the second predetermined time T2 (Yes in step S47), the second processor reduces the preliminarily determined internal circulation ratio (A %) by a third predetermined value (D %) which is larger than the second predetermined value (C %) at every second predetermined time interval L2 in step S48.

In one exemplary embodiment, M1 is 5 dB, M2 is 20 dB, the second predetermined time T2 is 30 s, the third predetermined time T3 is 10 s, the second predetermined time L2 is 30 s, the second predetermined value (C %) is 5%, and the third predetermined value is 10%, but the present disclosure is not limited thereto.

In the following Table 4, some situations are specifically listed.

TABLE 4

| CASE | Sound intensity (B) | Duration time of current sound intensity (T'/T") | Internal circulation ratio (A %) |
|---|---|---|---|
| CASE 0 | B ≤ B0 ± 5 | — | A % |
| CASE 1 | B0 + 5 < B < B0 + 20 | T' ≤ 30 | A % |
| CASE 2 | B0 + 5 < B < B0 + 20 | T' > 30 | Reduce A % by 5% at every 30 s |
| CASE 3 | B ≥ B0 + 20 | 10 < T" ≤ 30 | Reduce A % by 5% at every 30 s |
| CASE 4 | B ≥ B0 + 20 | T" > 30 | Reduce A % by 10% at every 30 s |

When CASE number is increased, the changing speed of the internal circulation ratio needs to be immediately executed according to the current level request. For example, when it immediately enters from CASE0/1 to CASE 4, the internal circulation ratio is immediately changed according to the request of CASE4.

When the CASE number is reduced, for example, it enters from CASE4 to CASE 2/3, the internal circulation ratio is changed according to the request of CASE 2/3, and when it enters to CASE0/1, the internal circulation ratio is increased by 5% at every minute until the ratio becomes A %.

According to the exemplary embodiment of the present disclosure, the second processor sends the adjusted internal circulation ratio to the controller, the controller controls the air conditioning system for the vehicle according to the adjusted internal circulation ratio and implements the control of the structure of the internal circulation and fresh air circulation of the air conditioning system for the vehicle illustrated in FIG. 6.

Figure 8:
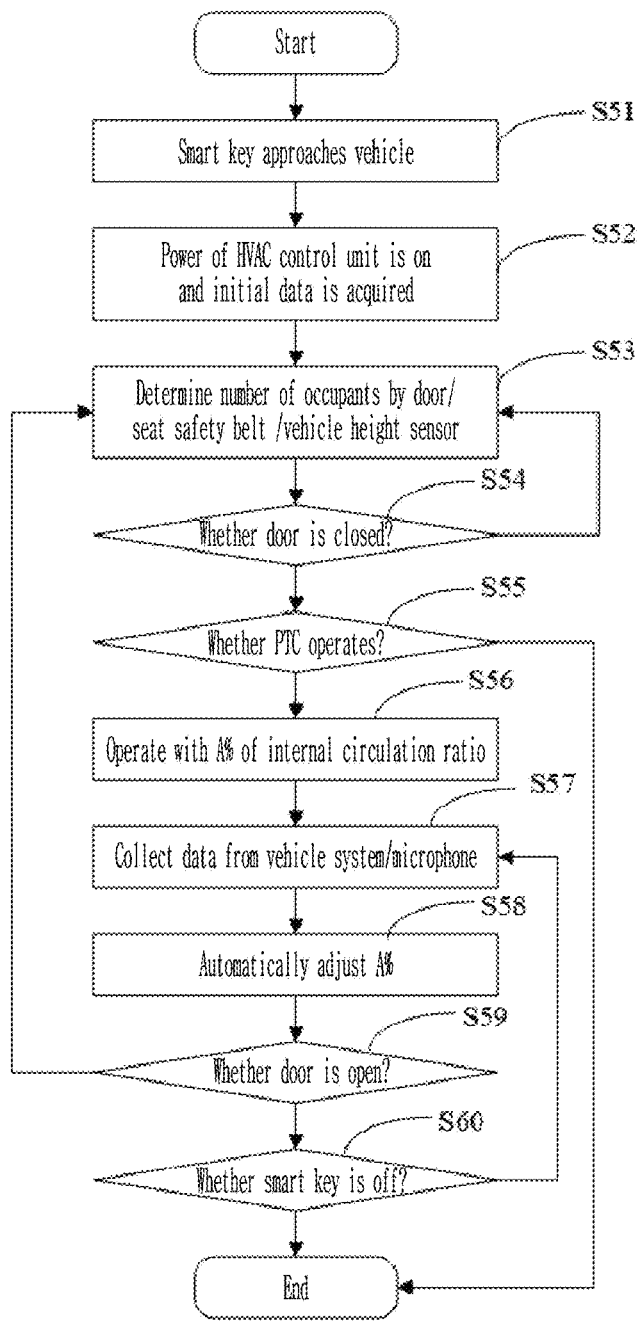
FIG. 8 is a flowchart illustrating a method of controlling an air conditioning system for a vehicle according to an exemplary embodiment of the present disclosure.

FIG. 8 is a flowchart illustrating a method of controlling an air conditioning system for a vehicle according to an exemplary embodiment of the present disclosure. As illustrated in FIG. 8, in a method of controlling an air conditioning system for a vehicle according to an exemplary embodiment of the present disclosure, when the smart key approaches the vehicle within 1 m to 2 m in step S51, the IBU of the vehicle sends a controller area network (CAN) signal to the HVAC control unit and the power of the HVAC control unit is turned on to acquire initial data in step S52.

The method of controlling the air conditioning system for the vehicle according to an exemplary embodiment of the present disclosure includes steps of sensing the open/close of the door, the fastening or the unfastening of the seat safety belt, and the changed value of the vehicle height, respectively. The number of all occupants in the vehicle is determined by the sensed open/close of the door, the fastening or unfastening of the seat safety belt, and the changed value of the vehicle height in step S53.

Next, it is determined whether the door is closed in step S54 and when the door is completely closed (Yes in the step S54), it means that the boarding process of the occupant has already ended. Further, since the number of occupants in the vehicle is fixed so that the determining of the number of all occupants in the vehicle ends. When the vehicle is driven or is idling in a state in which the air conditioning (A/C) system is turned on, a subsequent step may be performed. However, if the vehicle is used for camping or other door is open, the subsequent step is not performed.

When the door is not closed (No in the step S54), the process of determining the number of occupants by the plurality of sensors is performed in the step S53.

When the door is completely closed (Yes in the step S54), it is determined whether to operate a PTC heater of the vehicle in step S55. When the PTC heater does not operate or the ventilation is performed while opening the window, the subsequent step is not performed.

Further, when the ambient temperature outside the vehicle is equal to or higher than a predetermined temperature (for example, 0° C.), the control of the air conditioning system for the vehicle according to the internal circulation ratio is not performed.

When the PTC heater of the vehicle is operating, (Yes in the step S55), the internal circulation ratio (A %) of the air conditioning system is preliminarily determined according to the determined number of all occupants in the vehicle, and the air conditioning system operates at A % of the internal circulation ratio in step S56.

Next, call duration time data is collected from the vehicle on-board system and sound data is collected from the microphone in step S57 to acquire information about the sound intensity and/or the sound duration time in the vehicle. The preliminarily determined internal circulation ratio (A %) is adjusted according at least one of the sound intensity and the sound duration time in the vehicle in step S58. The air conditioning system is controlled according to the adjusted internal circulation ratio.

When the door is open again after the vehicle runs for a certain time period (Yes in step S59), the process returns to the step S53 to determine the number of all occupants in the vehicle again.

Further, when the smart key is off (Yes in step S60), it means that the occupant gets off, and the method of controlling the air conditioning system for the vehicle is not performed any more.

According to the exemplary embodiment of the present disclosure, the step S53 of determining the number of all occupants in the vehicle includes a step of determining that there is a driver when the driver seat side door is open and the fastening of the driver seat safety belt is sensed, and a step of determining that there is a front passenger when the opening of the front passenger side door is open and the fastening of the front passenger seat safety belt is sensed.

When it is sensed that at least one of the back seat side doors is open and the change in the vehicle height is sensed from at least one side, the number of occupants on the back seats is determined according to the sensed change of the vehicle height. The step of determining the number of back seat occupants includes, when the vehicle height change is sensed at one side, a step of determining the number of back seat occupants to be 0 if the change of the vehicle height is 0 (or if a change of the vehicle height is negligible, e.g., within a range of 0 mm to 5 mm, a step of determining that the back seat occupant enters the vehicle to increase the number of back seat occupants to 1 if the change in the vehicle height is smaller than 0 (or if the change in height has decreased due to the passenger load), and a step of determining that the back seat occupants moves the position to maintain the number of back seat occupants if the change of the vehicle height is larger than 0 (or if the change in height has increased due to the passenger load). When the change of the vehicle height is sensed at both sides, a maximum value of the number of back seat occupants determined at both sides is considered as the number of the back seat occupants.

Accordingly, it is possible to determine whether there is the driver, whether there is the front seat passenger, and the number of all occupants in the vehicle according to the number of back seat occupants.

According to the exemplary embodiment of the present disclosure, the step S58 of adjusting the magnitude A % of the preliminarily determined internal circulation ratio includes a step of determining whether the occupant is on the call. When it is determined that the occupant is on the call, the call duration time is acquired. When the call duration time is below the first predetermined time, the magnitude of the preliminarily determined internal circulation ratio is not adjusted. When the call duration time is longer than the first predetermined time, the preliminarily determined internal circulation ratio is reduced by the first predetermined value at the first predetermined time interval until the internal circulation ratio becomes 0. When the predetermine time elapses after ending the call, the internal circulation ratio is recovered to the preliminarily determined internal circulation ratio.

When it is determined that the occupant is not on the call, the reference sound intensity in the vehicle is determined. When the current sound intensity in the vehicle is equal to or lower than the sum of the reference sound intensity and the first predetermined sound intensity value, the preliminarily determined internal circulation ratio is not adjusted. When the current sound intensity in the vehicle is larger than the sum of the reference sound intensity and the first predetermined sound intensity value and is smaller than the sum of the reference sound intensity and the second predetermined sound intensity value which is larger than the first predetermined sound intensity value, the duration time of the current sound intensity in the vehicle is determined. When the duration time of the current sound intensity in the vehicle is equal to or shorter than the second predetermined time, the preliminarily determined internal circulation ratio is not adjusted. When the duration time of the current sound intensity in the vehicle is longer than the second predetermined time, the preliminarily determined internal circulation ratio is reduced by the second predetermined value at every second predetermined time interval. When the current sound intensity in the vehicle is larger than the sum of the reference sound intensity and the second predetermined sound intensity value, the duration time of the current sound intensity in the vehicle is determined and when the duration time of the current sound intensity in the vehicle is equal to or shorter than the third predetermined time which is shorter than the second predetermined time, the preliminarily determined internal circulation ratio is not adjusted. When the duration time of the current sound intensity in the vehicle is longer than the third predetermined time and is equal to or shorter than the second predetermined time, the preliminarily determined internal circulation ratio is reduced by the second predetermined value at every second predetermined time interval and when the duration time of the current sound intensity in the vehicle is longer than the second predetermined time, the preliminarily determined internal circulation ratio is reduced by the third predetermined value which is larger than the second predetermined value at every second predetermined time interval.

Further, the step of determining the reference sound intensity in the vehicle includes a step of determining a reference noise intensity in the vehicle depending on the driving speed of the vehicle and the radio On or Off.

The effects of the system and the method of controlling the air conditioning system for the vehicle according to the exemplary embodiment of the present disclosure are as follows:

According to the exemplary embodiment of the present disclosure, the system and the method of controlling the air conditioning system for the vehicle preliminarily determine the internal circulation ratio for controlling the air conditioning system to constantly reduce a risk of the fogging.

According to the exemplary embodiment of the present disclosure, the system and the method of controlling the air conditioning system for the vehicle adjust the initial internal circulation ratio according to the sound duration time and/or the sound intensity after determining whether the occupant conversation time is too long or whether the conversation sound is too loud according to the sound data collected by the microphone and the call data of the vehicle on-board system which implements the real-time interlink between the mobile phone and the vehicle, to reduce the risk of the fogging, thereby improving a driving stability of the vehicle. By doing this, all electric range (AER) of the electric vehicles may be increased and the stability of the vehicle is not reduced.

Various exemplary embodiments of the present disclosure do not list all possible combinations, but describe representative aspects of the present disclosure and the contents described as various exemplary embodiments may be applied independently or by a combination of two or more.

The above description of the exemplary embodiment merely describes the technical solutions of the present disclosure, and should not be construed as exhaustive, it is not intended to limit the present disclosure to the exactly described form. It is obvious to those skilled in the art to make various modifications and changes according to the detailed description. Selected and described exemplary embodiments are intended to interpret specific principles of the present disclosure and practical applications thereof to allow those skilled in the art to utilize the exemplary embodiments of the present disclosure and different alternative and modified forms thereof. The scope of the present disclosure is limited by the appended claims and the equivalents thereof.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A system for controlling an air conditioning system for a vehicle, comprising:
   a plurality of sensors configured to sense: an opening/closing of at least one door, a fastening/unfastening of at least one seat safety belt, and a change in a vehicle height;
   a first processor configured to: determine the number of all occupants in the vehicle by the opening/closing of the at least one door, the fastening/unfastening of the at least one seat safety belt, and the change in the vehicle height is sensed by at least one sensor of the plurality of sensors, and determine a preliminary internal circulation ratio of the air conditioning system according to the determined number of all occupants in the vehicle;
   a second processor configured to adjust the preliminary internal circulation ratio into an adjusted internal circulation ratio according to at least one of: a sound intensity in the vehicle and/or a sound duration time in the vehicle; and a controller configured to control the air conditioning system according to the adjusted internal circulation ratio, wherein the second processor is further configured to determine: whether an occupant is on a call, to acquire a call duration time if it is determined that the occupant is on the call, not to adjust the preliminarily determined internal circulation ratio when the call duration time is equal to or lower than a first predetermined time, and if the call duration time is longer than the first predetermined time, to reduce the preliminarily determined internal circulation ratio by a first predetermined value at every first predetermined time interval until the internal circulation ratio becomes zero.

2. The system of claim 1, wherein:

if at least one sensor of the plurality of sensors senses that a driver seat side door is open and a driver seat safety belt is fastened, the first processor is configured to determine that there is a driver, if at least one sensor of the plurality of sensors senses that a front passenger seat side door is open and a front passenger seat safety belt is fastened, the first processor is configured to determine that there is a front passenger, and if at least one sensor of the plurality of sensors senses that at least one back seat side door is open and the change in the vehicle height changes on at least one side of the vehicle, the first processor is configured to determine a number of back seat occupants according to the sensed change in the vehicle height.

3. The system of claim 2, wherein if the change in the vehicle height is sensed at one side, the first processor is further configured to:

determine that the number of occupants is zero if the change in the vehicle height is 0 mm;

determine that the back seat occupant has entered the vehicle and to increase the number of back seat occupants by 1 if the change in the vehicle height decreases; and determine that the back seat occupant moves a position to maintain the number of back seat occupants when the change in the vehicle height increases.

4. The system of claim 3, wherein, if at least one sensor of the plurality of sensors senses the change in the vehicle height at both sides, the first processor is configured to determine a maximum value of the number of back seat occupants determined at both sides to be the number of back seat occupants.

5. The system of claim 1, wherein, if a predetermined time elapses after the call ends, the second processor is further configured to recover the internal circulation ratio to the preliminarily determined internal circulation ratio.

6. The system of claim 1, wherein the second processor is further configured to:

collect the sound intensity in the vehicle if it is determined that the occupant is not on the call;

determine a reference sound intensity in the vehicle;

not to adjust the preliminarily determined internal circulation ratio if the current sound intensity in the vehicle is equal to or lower than a sum of the reference sound intensity and a first predetermined sound intensity value;

determine the duration time of the current sound intensity in the vehicle if the current sound intensity in the vehicle is larger than the sum of the reference sound intensity and the first predetermined sound intensity value and is smaller than a sum of the reference sound intensity and a second predetermined sound intensity value which is larger than the first predetermined sound intensity value;

not adjust the preliminarily determined internal circulation ratio if the duration time of the current sound intensity in the vehicle is equal to or shorter than a second predetermined time;

reduce the preliminarily determined internal circulation ratio by a second predetermined value at every second predetermined time interval if the duration time of the current sound intensity in the vehicle is longer than the second predetermined time;

determine the duration time of the current sound intensity in the vehicle if the current sound intensity in the vehicle is larger than the sum of the reference sound intensity and the second predetermined sound intensity value;

not adjust the preliminarily determined internal circulation ratio if the duration time of the current sound intensity in the vehicle is equal to or shorter than a third predetermined time which is shorter than the second predetermined time;

reduce the preliminarily determined internal circulation ratio by the second predetermined value at every second predetermined time interval if the duration time of the current sound intensity in the vehicle is longer than the third predetermined time and is equal to or shorter than the second predetermined time; and reduce the preliminarily determined internal circulation ratio by a third predetermined value, which is larger than the second predetermined value at every second predetermined time interval, if the duration time of the current sound intensity in the vehicle is longer than the second predetermined time.

7. The system of claim 6, wherein the second processor is further configured to determine the reference noise intensity in the vehicle according to a driving speed of the vehicle and whether a radio is on or off.

8. The system of claim 1, wherein, if an ambient temperature outside the vehicle is equal to or higher than a predetermined temperature, the controller is configured to not control the air conditioning system according to the internal circulation ratio.

9. The system of claim 1, wherein, if the at least one door is completely closed, the first processor is configured to end the determining the number of all occupants in the vehicle.

10. A method of controlling an air conditioning system for a vehicle, comprising:

sensing opening/closing of at least one door, fastening or unfastening of at least one seat safety belt, and a change in a vehicle height;

determining the number of all occupants in the vehicle by the sensed opening/closing of the at least one door, the fastening or unfastening of the at least one seat safety belt, and the change in the vehicle height;

preliminarily determining an internal circulation ratio of the air conditioning system according to the determined number of all occupants in the vehicle;

adjusting the preliminarily determined internal circulation ratio into an adjusted internal circulation ratio according to at least one of a sound intensity in the vehicle and/or a sound duration time in the vehicle; and controlling the air conditioning system according to the adjusted internal circulation ratio, wherein adjusting the internal circulation ratio which is preliminarily determined includes:

determining whether the occupant is on a call;

acquiring a call duration time if it is determined that the occupant is on the call;

not adjusting the preliminarily determined internal circulation ratio if the call duration time is below a first predetermined time; and reducing the preliminarily determined internal circulation ratio by a first predetermined value at a first predetermined time interval until the internal circulation ratio becomes zero if the call duration time is longer than the first predetermined time.

11. The method of claim 10, wherein the determining the number of all occupants in the vehicle step includes:

determining that there is a driver if a driver seat side door is open and fastening of a driver seat safety belt is sensed;

determining that there is a front passenger if opening of a front passenger side door and fastening of a front passenger seat safety belt are sensed; and determining the number of occupants of the back seats according to the sensed change in the vehicle height if it is sensed that at least one back seat side door is open and the change in the vehicle height is sensed from at least one side.

12. The method of claim 11, wherein the determining the number of back seat occupants if the change in the vehicle height is sensed at one side includes:

determining the number of back seat occupants to be 0 if the change of the vehicle height is 0 mm;

determining that the back seat occupant enters the vehicle to increase the number of back seat occupants to 1 if the change in the vehicle height decreases; and determining that the back seat occupant moves a position to maintain the number of back seat occupants if the change in the vehicle height increases.

13. The method of claim 12, wherein the determining the number of back seat occupants further includes:

if the change in the vehicle height is sensed at both sides, determining a maximum value of the number of back seat occupants determined at both sides as the number of the back seat occupants.

14. The method of claim 10, wherein adjusting the internal circulation ratio which is preliminarily determined further includes:

recovering the internal circulation ratio to the preliminarily determined internal circulation ratio if a predetermine time elapses after ending the call.

15. The method of claim 9, wherein adjusting the internal circulation ratio which is preliminarily determined further includes:

collecting the sound intensity in the vehicle if it is determined that the occupant is not on the call;

determining a reference sound intensity in the vehicle;

not adjusting the preliminarily determined internal circulation ratio if the current sound intensity in the vehicle is equal to or lower than a sum of the reference sound intensity and a first predetermined sound intensity value;

determining a duration time of the current sound intensity in the vehicle if the current sound intensity in the vehicle is larger than the sum of the reference sound intensity and the first predetermined sound intensity value and is smaller than a sum of the reference sound intensity and a second predetermined sound intensity value which is larger than the first predetermined sound intensity value;

not adjusting the preliminarily determined internal circulation ratio if the duration time of the current sound intensity in the vehicle is equal to or shorter than a second predetermined time;

reducing the preliminarily determined internal circulation ratio by a second predetermined value at every second predetermined time interval if the duration time of the current sound intensity in the vehicle is longer than the second predetermined time;

determining the duration time of the current sound intensity in the vehicle if the current sound intensity in the vehicle is larger than the sum of the reference sound intensity and the second predetermined sound intensity value;

not adjusting the preliminarily determined internal circulation ratio if the duration time of the current sound intensity in the vehicle is equal to or shorter than a third predetermined time which is shorter than the second predetermined time;

reducing the preliminarily determined internal circulation ratio by a second predetermined value at every second predetermined time interval if the duration time of the current sound intensity in the vehicle is longer than the third predetermined time and is equal to or shorter than the second predetermined time, and reducing the preliminarily determined internal circulation ratio by a third predetermined value which is larger than the second predetermined value at every second predetermined time interval if the duration time of the current sound intensity in the vehicle is longer than the second predetermined time.

16. The method of claim 15, wherein determining the reference sound intensity in the vehicle includes:

determining a reference noise intensity in the vehicle depending on a driving speed of the vehicle and whether a radio is On or Off.

17. The method of claim 10, wherein, if an ambient temperature outside the vehicle is equal to or higher than a predetermined temperature, the control of the air conditioning system according to the internal circulation ratio is not performed.

18. The method of claim 10, wherein, if the at least one door is completely closed, the determining the number of all occupants in the vehicle ends.

* * * * *